United States Patent Office 3,513,748
Patented May 26, 1970

3,513,748
VIEWFINDER FOR PHOTOGRAPHIC
CAMERA AND THE LIKE
Friedrich Mische, Braunschweig, Germany, assignor to
Voigtlander, A.G.
Filed Mar. 21, 1967, Ser. No. 624,789
Claims priority, application Germany, Mar. 25, 1966,
V 30,719
Int. Cl. G03b 13/02, 19/00, 17/50
U.S. Cl. 88—1.5
6 Claims

ABSTRACT OF THE DISCLOSURE

A viewfinder having front and rear walls repsectively formed with coaxial front and rear viewfinder windows. The front wall carries beside the front window of the viewfinder a light-permeable frame means formed by suitable openings in the front wall through which light enters to form an image of a frame for the object which is seen by the operator when looking into the viewfinder through the rear window thereof. Situated in the space between the front and rear walls behind this frame means is a first optical means for deflecting light rays which enter through the frame means toward the space between the viewfinder windows, and situated between the viewfinder windows is a second, semi-transparent optical deflecting means for deflecting the light rays which are deflected by the first optical deflecting means rearwardly through the rear viewfinder window so that the operator when looking into the latter will see an image of the frame means. This second optical deflecting means has a concave surface directed toward the first optical deflecting means and the rear window so as to provide for the image of the frame means a size larger than that which would be provided if this surface of the second optical deflecting means were flat. The frame means takes the form of angled openings situated at the corners of the frame means and forming lateral frame portions through which light rays pass to the first optical deflecting means, and the concave surface of the second optical reflecting means is angled and provided with flat surface portions which respectively deflect light which passes through the lateral frame portions of the frame means, these flat surface portions of the angled concave surface intersecting each other along a line which is situated between the light rays which are respectively received from the lateral frame portions. A converging lens means is situated between the front and rear walls of the viewfinder and between the first and second optical deflecting means for providing a sharp image of the frame means and for parallelizing the light rays which respectively pass through the lateral frame portions after the latter light rays have been deflected by the first optical deflecting means.

BACKGROUND OF THE INVENTION

The present invention relates to viewfinders for photographic cameras.

In particular, the present invention relates to viewfinders which have coaxial front and rear windows through which pass light rays which provide the operator with an image of the object which is to be photographed. The viewfinder of the present invention is the type where an image of a frame for the object which is to be photographed is reflected into the light rays which pass through the front and rear viewfinder windows. For this purpose a suitable frame structure is situated beside the front window to direct light rays which will form the frame image into the space between the front and rear walls of the viewfinder, and situated behind this frame is an optical deflecting means which deflects the light which passes through the frame toward the space between the front and rear viewfinder windows. Situated between the latter windows is a second optical deflecting means which is semi-transparent and which receives the light deflected by the first deflecting means to direct this latter light rearwardly through the rear window of the viewfinder, so that when the operator looks into the rear window of the viewfinder he will see not only an image of the object which is to be photographed but also an image of a frame which frames the object which is to be photographed.

Viewfinders of this type are known as two-axis viewfinders having separate reflection of a frame image into the field which is seen through the viewfinder. These well known types of viewfinders generally have a flat semi-transparent reflecting surface situated between the viewfinder windows and forming the structure for providing the second optical deflection of the light rays which form the frame image. When a finder of this type provides a degree of enlargement which is on the order of 0.8–1, difficulties are encountered in reflecting the image of the frame into the field of the viewfinder. Where the image angles are of this latter magnitude, the light rays which form the frame image extend in strongly divergent directions with respect to each other, diverging not only from the rear toward the front window of the viewfinder but also from the second toward the first light-deflecting structure which deflects the frame-image light rays. Because the space between the front and rear walls of a camera cap which accommodates such a viewfinder is generally limited, viewfinders of this type having such strongly diverging light rays cannot be accommodated in the space which is available in the hollow camera cap which is situated over the camera housing and which defines the housing for the viewfinder.

SUMMARY OF THE INVENTION

The viewfinder of the present invention includes the front and rear walls which are respectively formed with the coaxial front and rear viewfinder windows, this front wall carrying beside the front window of the viewfinder a light-permeable frame means through which light enters into the space between the front and rear walls. Situated behind this frame means is a first optical deflecting means for deflecting the light rays which pass through the frame means toward the space between the front and rear viewfinder windows, and situated between the front and rear viewfinder windows is a second optical deflecting means which deflects the rays deflected by the first optical deflecting means rearwardly toward and through the rear window so that the operator when looking into the rear window will see not only the object which is to be photographed but also an image of a frame for the object which is to be photographed. In accordance with the present invention this second optical deflecting means has a concave surface directed toward the first optical deflecting means and the rear window so as to provide a frame image which is larger than that which would be provided if this surface of the second optical deflecting means were flat.

In this way it becomes possible with the structure of the invention to provide for a two-axis viewfinder having separate reflection of a frame image into the viewfinder a size for the image frame which is as large as desired even though there is a limited space between the front and rear walls of the viewfinder.

Thus, it is an object of the invention to provide a viewfinder construction which enables a relatively large frame image to be achieved even though the space between the front and rear walls of the viewfinder is limited.

Although the concave surface of the second optical deflecting means can be curved, it is preferably angled and composed of a pair of flat surface portions which intersect each other along a straight line which is situated between light rays which respectively pass through lateral portions of the frame means so that the light rays which pass through one lateral portion of the frame means will be deflected by one of these flat surface portions of the concave surface while the light rays which pass through the other of the lateral farme portions will be deflected by the other of the flat surface portions of the concave surface of the second optical deflecting means.

As a result of this curved or angled construction of the surface of the second optical deflecting means, the light rays of the different portions of the frame means are located closer to each other so that they can be accommodated in a camera cap which does not have any particularly large dimensions between its front and rear walls. It thus becomes possible in the first place to provide two-axis finders of the above type with a relatively large image angle for the image frame limits, and in the second place to achieve this latter result in an extremely simple manner.

In the case where the frame means includes four angled openings passed through the front wall at the corners of the frame a particularly simple construction is provided since in this case the frame means has lateral portions through which light rays respectively pass to be separately deflected by the flat surface portions of the concave surface of the second optical deflecting means, these latter flat surface portions intersecting each other along a line situated between the two groups of light rays which respectively pass through the pair of lateral frame portions.

Whatever divergence remains in the light rays even where the reflecting surface of the second optical deflecting means is angled can be eliminated in accordance with the invention by situating between the first and second optical deflecting means a converging lens means which will provide a sharp image of the frame and which will parallelize the light rays from the pair of opposed lateral frame portions.

Thus, it is a more detailed object of the present invention to provide a relatively simple viewfinder structure which will avoid the drawbacks involved in the excessive divergence of light rays which is encountered with relatively large image angles because of the limited space which is available for a viewfinder in a conventional camera.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 1:
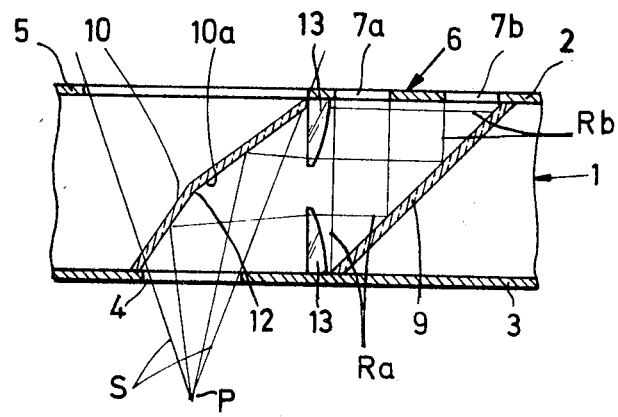
FIG. 1 is a horizontal sectional plan view taken in a plane which passes through a hollow cap of a camera beneath the top wall of the cap but above the top wall of the camera housing, this cap accommodating in its interior the viewfinder of the invention which is shown in a sectional plan view in FIG. 1.
Figure 2:
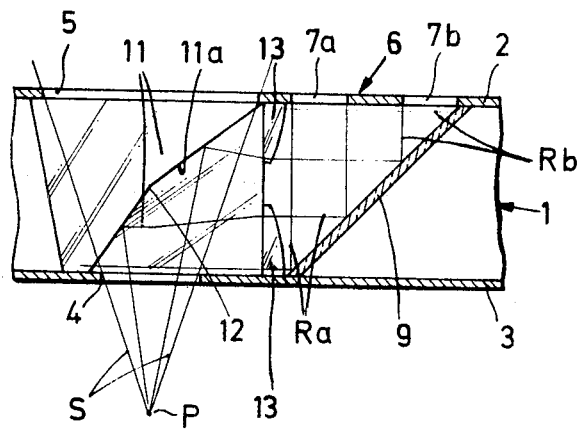
FIG. 2 is a sectional plan view situated with respect to the camera structure in the same way as the plane of FIG. 1 but illustrating another embodiment of a viewfinder according to the invention.
Figure 3:
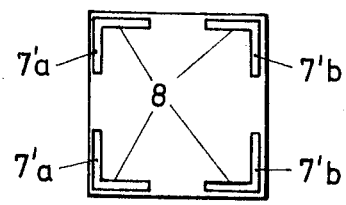
FIG. 3 is a front elevation of a frame means used with the embodiments of FIGS. 1 and 2.

Referring now to FIGS. 1 and 2, there is illustrated therein the camera cap 1 which defines a hollow space situated over the top wall of the camera housing and adapted to accommodate structures such as the viewfiinder of the camera. This cap has a front wall 2 and a rear wall 3. The rear wall 3 is formed with the rear viewfinder window 4, through which the operator looks into the viewfinder, while the front wall 2 is formed with a front viewfinder window 5 which is coaxial with and larger than the rear window 4. The front wall 2 carries beside the front window 5 of the viewfinder a frame means 6 formed by openings of suitable configuration passing through the front wall 2, so that the frame means 6 actually is a mask which masks light rays so that they will enter only through openings of predetermined configuration into the space between the front and rear walls. The frame means includes lateral frame portions formed by openings 7a and 7b, respectively, these openings being situated at the opposed sides of the frame means. As may be seen from FIG. 3, the openings 7a take the form of angled openings 7'a respectively situated at the upper and lower corners at one side of the frame means and each having the configuration of a right angle, while the openings 7b are formed by a pair of angled openings 7'b situated at the other side of the frame means at the corners thereof and also having the configuration of a right angle. In this way the several openings coact to form the frame 8 the image of which will limit the field seen through the viewfinder so that the object which is to be photographed will be situated within a suitable frame image formed by the image of the frame 8.

The viewfinder light rays S extend from the observation point P through the rear window 4 and the front window 5 of the viewfinder. The light-permeable frame means 6 directs into the space between the front and rear walls light rays which are deflected by a first optical deflecting means 9, which is situated behind the frame means 6, to a second optical deflecting means 10 which is situated between the viewfinder windows, and by way of this pair of optical deflecting means an image of the frame is reflected into the viewfinder light rays S. The first optical deflecting means 9 can take the form of a simple reflector in the form of a mirror, for example, having a totally reflecting surface directed forwardly toward the frame means 6 and reflecting the light toward the second optical deflecting means 10. This optical deflecting means 10, however, has a semi-transparent reflecting surface 10a in the embodiment of FIG. 1 where the second optical deflecting means 10 is in the form of a simple plate which is transparent and of uniform thickness and which carries the semi-transparent reflecting surface 10a which is directed toward the first optical deflecting means 9 and the rear window 4.

In the embodiment of FIG. 2, a glass transparent block 11 is situated between the viewfinder windows and carries in its interior a semi-transparent reflecting surface 11a which serves to deflect the light rays received from the first optical deflecting means 9 rearwardly through the rear window 4, so that in this way the image of the frame means 6 is also reflected into the viewfinder rays S.

In accordance with the present invention the surfaces 10a and 11a of the second optical deflecting means are concave and preferably include a pair of flat surface portions which intersect each other along a line 12 which is situated between the light rays passing through the openings 7a on one side of the frame means and the light rays passing through the openings 7b on the other side of the frame means. In this way the separate flat surface portions of each concave semi-transparent reflecting surface respectively serve to deflect the light rays which respectively pass through the lateral frame portions.

Thus, it will be noted that the light rays Ra which pass through the frame openings 7'a are received by the flat portion of the reflecting surface 10a or 11a between the line 12 thereof and the rear wall 3, while the light rays Rb which pass through the openings 7'b are reflected by the flat surface portion of the concave surface 10a or 11a which is situated between the line of intersection 12 and the front wall of the viewfinder.

In accordance with a further feature of the invention there is situated next to and against the right side surface of the glass block 11, as viewed in FIG. 2, this latter surface of the block being directed toward the first optical deflecting means 9, a converging lens means 13. In the embodiment of FIG. 1, the converging lens means 13 is situated next to the front edge of the second deflecting means 10, where this front edge engages the front wall 2 between the window 5 and the frame means 6, and the converging lens means 13 of FIG. 1 is also situated adjacent the rear edge of the first optical deflecting means 9 where this rear edge engages the rear wall oppositely from the portion of the front wall which is situated between the front window and the frame means 6. The situation of this converging lens means 13 is such that the groups of light rays R$a$ and R$b$ necessarily pass therethrough so that this lens means will provide a sharp image of the frame means and will in addition serve to parallelize the light rays. In this way the light ray bundles Ra and Rb will not diverge from the reflecting surfaces 10$a$ or 11$a$ toward the first optical deflecting means 9. By properly choosing the angle between the flat surface portions of the surfaces 10$a$ and 11$a$ where they intersect at the line 12, it is possible to accommodate the light ray bundles R$a$ and R$b$ within the space situated between the front and rear walls of the camera housing cap.

The invention is not limited to the details described above and shown in the drawings. For example, it is also possible to provide concave reflecting surfaces 10$a$ or 11$a$ which are continuously curved and do not include flat surface portions which intersect along a straight line 12. Moreover, it is possible to use other types of optical deflecting means such as, for example, prisms with semi-transparent reflecting surfaces. However, the particular constructions described above and shown in the drawings are prefered because of their great simplicity. Moreover, it should be noted that the frame means need not include four angled openings situated at the corners of the frame. It is also possible to provide the frame means with suitable cutouts situated between the corners thereof.

Moreover, it is possible to advantageously use the invention in all these cases where the particular construction of the camera provides only a limited space for the reflection of the image frame necessitating a location of the framing portions in an arrangement where they are undesirably close to each other, the structure of the invention making it possible to eliminate without difficulty this undesirable configuration of the frame by means of a suitable choice of the angle between the flat reflecting surface portions of the surfaces 10$a$ or 11$a$ so that the operator will see an image frame of a size suitable for the photograph.

Of course, all of the above-described features which are also shown in the drawings, including their details, can be combined together in accordance with the invention in any desired combinations.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a viewfinder for cameras or the like, front and rear walls respectively formed with coaxial front and rear viewfinder windows, light-permeable frame means carried by said front wall adjacent said front window for admitting into the space between said front and rear walls light rays which will form an image of a frame for an object seen by the operator when looking into said rear window, first optical deflecting means situated between said walls behind said frame means for deflecting said light rays along the space between said front and rear walls toward said viewfinder windows, and second, semi-transparent optical deflecting means situated in the space between said front and rear walls and between said windows for deflecting the light rays deflected by said first deflecting means toward and through said rear window so that the operator will see an image of said frame means, said second optical deflecting means having a concave surface directed toward said first optical deflecting means and said rear window for providing a frame image larger than that which would be provided if said surface of said second optical deflecting means were flat, said frame means having lateral frame portions situated at opposed sides thereof, and said surface of said second optical deflecting means being angled and including a pair of flat surface portions one of which deflects rays from one of said lateral frame portions and the other of which deflects light rays from the other of said lateral frame portions, said surface portions of said concave surface of said second optical deflecting means intersecting each other along a line situated between the light rays from said lateral frame portions, respectively, and a converging lens means situated between said front and rear walls and between said first and second optical deflecting means for providing a sharp image of said lateral frame portions and for parallelizing the light rays which pass through said lateral frame portions.

2. The combination of claim 1 and wherein said frame means has corners at which said lateral frame portions are located with each frame portion having the configuration of a right angle.

3. The combination of claim 1 and wherein said second optical deflecting means is in the form of a plate of substantially uniform thickness having portions which intersect each other at an angle and which respectively are provided with said flat surface portions of said concave surface.

4. The combination of claim 1 and wherein a glass transparent block is situated between said windows and carries in its interior a semi-transparent reflecting surface which forms said second optical deflecting means.

5. The combination of claim 4 and wherein said glass block has a surface which extends perpendicularly between said walls and which is directed toward said first optical deflecting means, and said converging lens means being situated against said latter surface of said glass block.

6. The combination of claim 1 and wherein said second optical deflecting means is in the form of a plate of substantially uniform thickness having angled portions which intersect each other at said line and which are respectively provided with said flat surface portions of said concave surface, said plate having edges respectively situated at said front and rear walls with said edge of said plate which is at said front wall located nearer to said frame means between the latter and said front window, said first optical means having a rear edge engaging said rear wall opposite a portion of said front wall which is between said front window and said frame means, and said converging lens means being situated between said front and rear walls in the region of said edge of said plate which engages said front wall and said edge of said first optical means which said engages and rear wall.

(References on following page)

References Cited

UNITED STATES PATENTS

| | | | |
|---|---|---|---|
| 3,129,275 | 4/1964 | Determann | 88—105 |
| 3,139,478 | 6/1964 | Papke | 88—105 |
| 3,332,330 | 7/1967 | Broschke et al. | 95—42 |

RONALD L. WIBERT, Primary Examiner

W. A. SKLAR, Assistant Examiner

U.S. Cl. X.R.

95—11, 13, 44